United States Patent [19]
Dixon

[11] Patent Number: 6,125,467
[45] Date of Patent: Sep. 26, 2000

[54] METHOD AND APPARATUS FOR PARTIAL WORD READ THROUGH ECC BLOCK

[75] Inventor: Robert Christopher Dixon, Austin, Tex.

[73] Assignee: International Business Machines Corporation, Armonk, N.Y.

[21] Appl. No.: 09/063,962

[22] Filed: Apr. 21, 1998

[51] Int. Cl.[7] .................................................. G06F 11/10
[52] U.S. Cl. .................................... 714/763; 714/779
[58] Field of Search ............................... 714/763, 764, 714/767–769, 772–779

[56] References Cited

U.S. PATENT DOCUMENTS

| | | | |
|---|---|---|---|
| 4,688,225 | 8/1987 | Fukami et al. ........................... | 714/755 |
| 4,745,604 | 5/1988 | Patel et al. ................................ | 714/753 |
| 4,779,232 | 10/1988 | Fukunaka et al. ....................... | 365/189 |
| 5,313,624 | 5/1994 | Harriman et al. ....................... | 395/575 |
| 5,349,611 | 9/1994 | Varian ..................................... | 375/115 |
| 5,392,289 | 2/1995 | Varian ..................................... | 371/5.4 |
| 5,412,671 | 5/1995 | Tsuchiya ................................. | 371/51.1 |
| 5,666,371 | 9/1997 | Purdham ................................. | 714/763 |

*Primary Examiner*—Emmanuel L. Moise
*Attorney, Agent, or Firm*—Volel Emile; Jack V. Musgrove; Andrew J. Dillon

[57] ABSTRACT

A method of passing transmissions through an error-correction code (ECC) block in a communications path of a computer system. The communications path interconnects a first component of the computer system (such as a random-access memory (RAM) device) and a second component of the computer system (such as a central processing unit (CPU)) using a first granularity, and a third component (such as a read-only memory (ROM) device) is further connected to the communications path such that the third component may transmit data to the second component using a second granularity which is smaller than the first granularity. The data from the third component passes through the ECC block by merging data from the third component with predefined data to present a merged data word to the ECC circuit, wherein the merged data word has the first granularity. The first granularity may be, e.g., 72 bits, while the second granularity is 8 bits. The undriven check bits and undriven data bits are preferably forced to the predefined state using a plurality of respective pull-up resistors.

15 Claims, 2 Drawing Sheets

METHOD AND APPARATUS FOR PARTIAL WORD READ THROUGH ECC BLOCK

BACKGROUND OF THE INVENTION

1. Field of the Invention

The present invention generally relates to computer systems, particularly to a method of transmitting information between different components in a computer system, such as between a system memory device and a central processing unit, and more specifically to a method and apparatus for reading a partial word through an error-correcting code (ECC) circuit.

2. Description of Related Art

A typical structure for a conventional computer system includes one or more processing units connected to a system memory device (random access memory or RAM) and to various peripheral, or input/output (I/O), devices such as a display monitor, a keyboard, a graphical pointer (mouse), and a permanent storage device (hard disk). The system memory device is used by a processing unit in carrying out program instructions, and stores those instructions as well as data values that are used or generated by the programs. A read-only memory device (ROM) is used to provide firmware whose primary purpose is to seek out and load an operating system from one of the peripherals (usually the permanent storage device) whenever the computer is first turned on. A processing unit communicates with the other components by various means, including one or more interconnects (buses), or direct memory-access channels. A computer system may have many additional components, such as serial and parallel ports for connection to, e.g., printers, and network adapters. Other components might further be used in conjunction with the foregoing; for example, a display adapter might be used to control a video display monitor, a memory controller can be used to access the system memory, etc.

An exemplary computer system 10 is illustrated in FIG. 1. System 10 includes a central processing unit (CPU) 12, firmware or read-only memory (ROM) 14, and a dynamic random access memory (DRAM) 16 which are all connected to a system bus 18. CPU 12, ROM 14 and DRAM 16 are also coupled to a peripheral component interconnect (PCI) local bus 20 using a PCI host bridge 22. PCI host bridge 22 provides a low latency path through which processor 12 may access PCI devices mapped anywhere within bus memory or I/O address spaces. PCI host bridge 22 also provides a high bandwidth path to allow the PCI devices to access DRAM 16.

Attached to PCI local bus 20 are a local area network (LAN) adapter 24, a small computer system interface (SCSI) adapter 26, an expansion bus bridge 28, an audio adapter 30, and a graphics adapter 32. Lan adapter 24 is used to connected computer system 10 to an external computer network 34. SCSI adapter 26 is used to control high-speed SCSI disk drive 36. Expansion bus bridge 28 is used to couple an ISA (Industry Standard Architecture) expansion bus 38 to PCI local bus 20. As shown, several user input devices are connected to ISA bus 38, including a keyboard 40, a microphone 42, and a graphical pointing device (mouse) 44. Other devices may also be attached to ISA bus 38, such as a CD-ROM drive 46. Audio adapter 30 controls audio output to a speaker 48, and graphics adapter 32 controls visual output to a display monitor 50.

Parity checks and error-correction codes (ECC's) are commonly used to ensure that data is properly transferred between system components. For example, a magnetic disk (permanent memory device) typically records not only information that comprises data to be retrieved for processing (the memory word), but also records an error-correction code for each file, which allows the processor, or a controller, to determine whether the data retrieved is valid. ECC's are also used with temporary memory devices, e.g., DRAM or cache memory devices, and the ECC for files stored in DRAM can be analyzed by a memory controller which provides an interface between the processor and the DRAM array. If a memory cell fails during reading of a particular memory word (due to, e.g., stray radiation, electrostatic discharge, or a defective cell), then the failure can at least be detected so that further action can be taken. ECC's can further be used to reconstruct the proper data stream.

Some error correction codes can only be used to detect single-bit errors; if two or more bits in a particular memory word are invalid, then the ECC might not be able to determine what the proper data stream should actually be. Other ECC's are more sophisticated and allow detection or correction of double errors, and some ECC's further allow the memory word to be broken up into clusters of bits, or "symbols," which can then be analyzed for errors in even more detail.

One limitation of ECC circuits relates to the fact that they are always designed to receive and analyze a memory word of a fixed width. In a computer system such as that shown in FIG. 1, DRAM 16 might provide a 64-bit data word (eight 8-bit bytes), with an additional 8-bit check word used for error correction (i.e., a total of 72 bits). Therefore, if an ECC circuit were implemented in an interconnection between the DRAM and some other component (such as CPU 12), then the ECC circuit would necessarily be constructed to specifically conform to the 72-bit format. The presence of an ECC circuit in this communications path, however, prevents other devices from using the path if they do not utilize the same word format. In other words, a problem exists where a memory word having a width less than the fixed width is to be read through the ECC block.

For example, in the system of FIG. 1, ROM 14 transmits single-byte data (8 bits). If ROM data were to pass through an ECC block adapted for DRAM 16, then the check word and the remaining data bits expected by the ECC block would be undefined. In this situation, one of three results can occur within the ECC block (depending upon the ROM value): no error is detected; a single-bit error is detected; or a multiple-bit error is detected. The case of "no error detected" is possible where the undefined signals input into the ECC block, along with the ROM byte, exactly match a "no error" pattern. This result will leave the ROM data bits unaffected, and therefore does not present a problem. In the case of "multiple-bit error detected," the undefined signals do not match the "no error" pattern, but the data is passed through unmodified anyway (including the ROM data), since the ECC block cannot determine which bits require correction, so this case also does not present a problem. However, in the case of "single-bit error detected," while the undefined signals do not match the "no error" pattern, the error-correction code presumes that the memory word has a single-bit error which can be corrected and, as a consequence, the ECC circuitry will modify the imagined 64-bit memory word, by complementing one of these 64 bits. If the modified bit is within the ROM data bits, a ROM corruption will appear to the reading device (e.g., CPU 12), which could lead to catastrophic failure of the system.

One solution to the foregoing problem is to simply make all devices which use a common ECC block operate at the same granularity, that is, with the same memory word size.

This solution is not, however, always feasible. For example, considering again the use of an ECC block which passes data from both a DRAM device and a ROM device, this approach would require the use of a 72-bit ROM, which is quite expensive compared to 8-bit ROMs. In light of the foregoing, it would be desirable to devise a method of passing different sizes of memory words through a common ECC block. It would be further advantageous if the method could be implemented at a relatively low cost and with less load on the CPU bus.

SUMMARY OF THE INVENTION

It is therefore one object of the present invention to provide an improved computer system having error-correction and detection in transmission of data between system components.

It is another object of the present invention to provide such a computer system wherein error-correction code (ECC) circuitry can be established in a single communications path used by devices having different memory word sizes, such as an 8-bit ROM and a 72-bit RAM.

It is yet another object of the present invention to provide a simple and inexpensive method of constructing such a compliant ECC block.

The foregoing objects are achieved in a method of communicating between components in a computer system, generally comprising the steps of providing a communications path between a first component of the computer system (such as a random-access memory (RAM) device) and a second component of the computer system (such as a central processing unit (CPU)), wherein the first component transmits data to the second component using a first granularity, and wherein the communications path includes an error-correction code (ECC) circuit adapted to detect and correct parity errors transmitted from the first component to the second component, interconnecting a third component to the communications path (such as a read-only memory (ROM) device) such that the third component may transmit data to the second component using a second granularity which is smaller than the first granularity, and merging data from the third component with predefined data to present a merged data word to the ECC circuit, the merged data word having the first granularity. The first granularity may be, e.g., 72 bits, while the second granularity is 8 bits. The data is merged by forcing undriven check bits and undriven data bits in the ECC block to a predefined state such that error correction of the merged data word by the ECC circuit results in modification of the predefined data and not in modification of the data from the third component. The undriven check bits and undriven data bits are preferably forced to the predefined state using a plurality of respective pull-up resistors.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DESCRIPTION OF AN ILLUSTRATIVE EMBODIMENT

Figure 2:
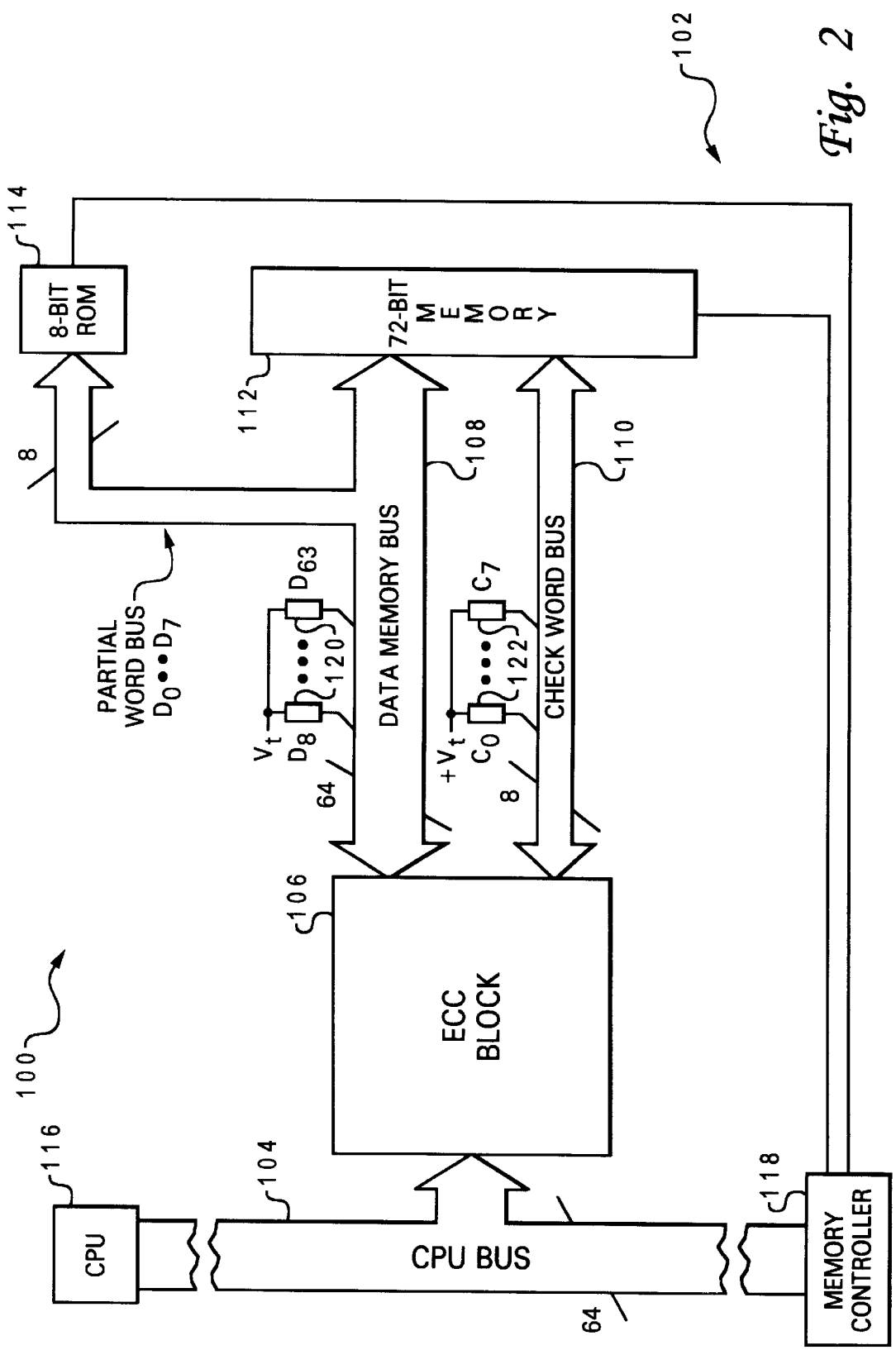
FIG. 2 is a block diagram of one embodiment of a communications path within a computer system, constructed in accordance with the present invention, which provides an error-correction code block usable by one device having a first granularity (a ROM device), and another device having a second granularity (a RAM device).

With reference now to the figures, and in particular with reference to FIG. 2, there is depicted one embodiment of a communications path 100 within a computer system 102, constructed in accordance with the present invention. Communications path 100 comprises a system or CPU bus 104, an ECC block 106, and a memory bus which in the depicted embodiment includes a data bus 108 and a check word bus 110. Check word bus 110 is connected to a memory device 112 having a large word size (granularity), such as a 72-bit DRAM device wherein 64 bits comprise the data word and eight bits comprise the check word. Data bus 108 is also connected to DRAM 112, and is further connected to an 8-bit ROM device 114 (containing the firmware used to start up system 102).

Figure 1:
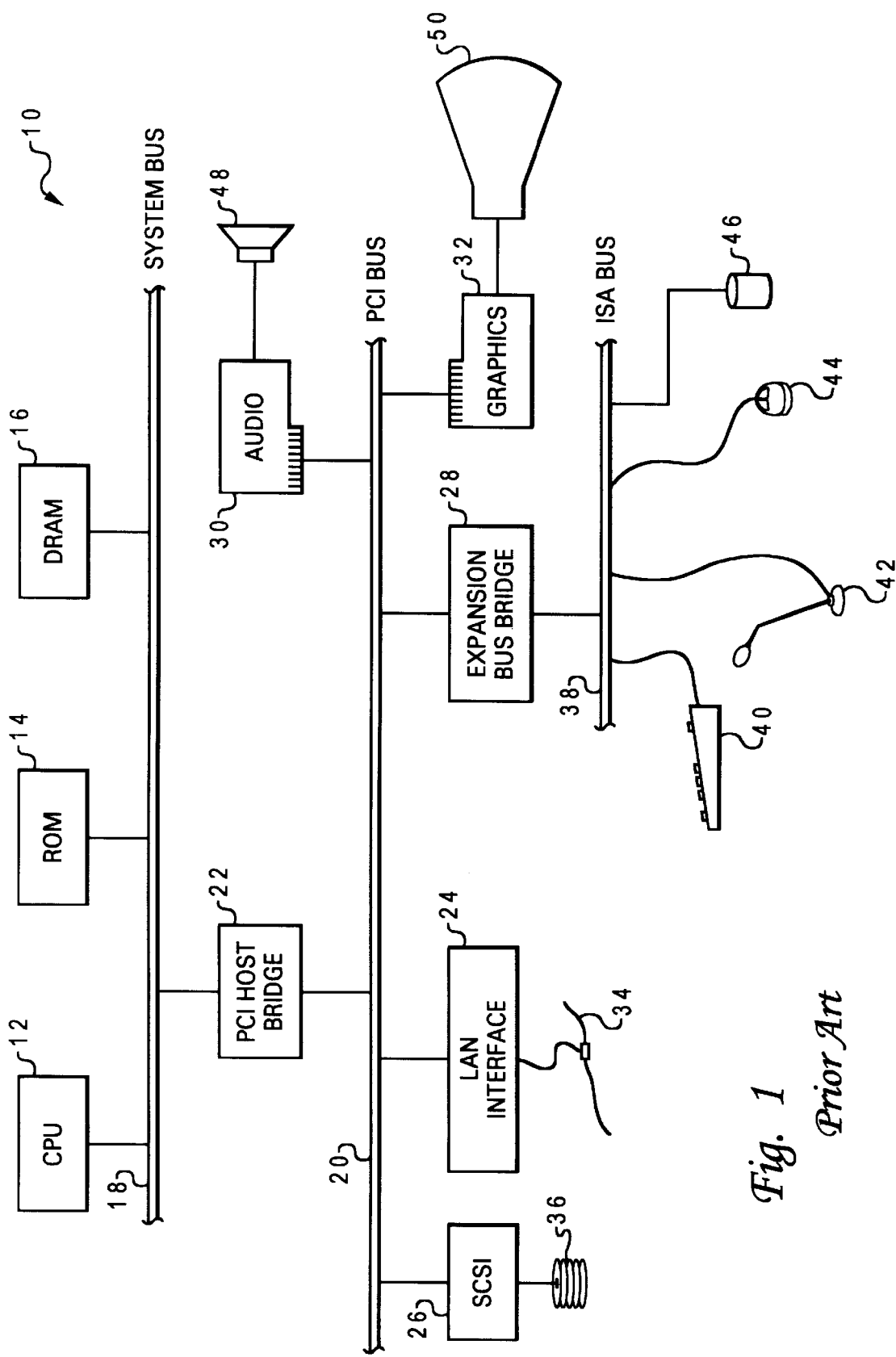
FIG. 1 is block diagram of a conventional computer system.

CPU bus 104 is connected to a CPU 116, a memory controller 118, and one or more other devices such as those shown in FIG. 1. While the various devices shown in FIG. 1 can be utilized in conjunction with a computer system constructed in accordance with the present invention, those skilled in the art will appreciate that the present invention may be applied to computer systems having novel components, or having novel arrangements of conventional components. Therefore, the reference to FIG. 1 should not be construed in a limiting sense.

ECC block 106 is designed to provide single-bit error correction and multi-bit error detection for the 72-bit memory words transmitted from DRAM 112. It is convenient, however, to allow ROM 114 to additionally use memory data bus 108 to provide an interconnection with CPU 116. The present invention overcomes the problem in prior art systems, of using a single ECC block with devices of differing granularities, by forcing the undriven check word and the undriven data bits (when ROM 114 owns the memory bus) to a predefined state wherein any single-bit errors based on the ECC block's "no error" pattern will result only in modifications to the imagined 64-bit data word that do not complement any of the eight bits in the ROM byte.

In a preferred embodiment, the undriven check word and the undriven data bits are forced to the predefined state using bias (pull-up) resistors 120 and 122. The ROM bits 0 . . . 7 supply data to the inputs Data00 . . . Data07. The data bits Data08 . . . Data63 are set to 1 for all ROM reads by resistors 120. The check bits Check0 . . . Check7 are similarly set to 1 for all ROM reads by resistors 122. The table included in the Appendix indicates the results for all 256 possible ROM data patterns. All 256 of these patterns pass the ROM data through the ECC block without modification, although some do result in modification of other data that is of no concern, since memory controller 118 examines only the first eight bits when constructing a 64-bit ROM word for CPU 116. In other words, memory controller 118 collects these first eight bits from a series of eight ROM reads, and then passes those 64 bits as a single ROM word to CPU 116.

It is preferable to select 1's in the static bits using pull-up resistors, since they can supply the necessary high logic level for the relatively long duration of the ROM cycle.

ROM 114 drives bus 108 for the ROM access time, but the data is only sampled after the access time. Therefore, pull-up resistors that result in an RC time constant less that the ROM access time (~150 ns) may be used. This approach is relatively low cost, particularly when compared to the alternatives of special bypass circuitry around the ECC block, or the expense of a 72-bit wide ROM. An alternative approach contemplated by the present invention is to use a bank of 1's provided by a buffer which is turned on when ROM 114 is selected, but that embodiment is more expensive. Either approach places significantly less load on the CPU bus as compared to the alternatives.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the foregoing embodiment illustrates the application of the invention to an 8-bit ROM and a 64-bit RAM, but the invention can further be adapted to interconnect devices having other granularities. The nature of the ECC block could be more complicated than described, and the communications path might interconnect devices other than memory and the CPU. It is therefore contemplated that such modifications can be made without departing from the spirit or scope of the present invention as defined in the appended claims.

APPENDIX

In each of the following cases, the term "trick" refers to the forced data ($D_8 \ldots D_{63}$ and $C_0 \ldots C_7$) merged with the ROM data. The term "in" is the output of ECC block 106. When "sbe_" is low (zero), this indicates single-bit error status. When "mbe_" is low (zero), this indicates multi-bit error status. In each case where sbe_ = 0, one bit is complemented but that bit is not in the ROM data (the rightmost two hexadecimal characters).

```
trick =ffffffffffff00  in =ffffffffffff00   rom = 00 sbe_ = 1 mbe_ = 0
trick =ffffffffffff01  in =ffffffffffff01   rom = 01 sbe_ = 1 mbe_ = 0
trick =ffffffffffff02  in =ffffffffffff02   rom = 02 sbe_ = 1 mbe_ = 0
trick =ffffffffffff03  in =ffffffffffff03   rom = 03 sbe_ = 1 mbe_ = 0
trick =ffffffffffff04  in =ffffffffffff04   rom = 04 sbe_ = 1 mbe_ = 0
trick =ffffffffffff05  in =ffffffffffff05   rom = 05 sbe_ = 1 mbe_ = 0
trick =ffffffffffff06  in =ffffffffffff06   rom = 06 sbe_ = 1 mbe_ = 0
trick =ffffffffffff07  in =ffffffff7ff07    rom = 07 sbe_ = 0 mbe_ = 1
trick =ffffffffffff08  in =ffffffffffff08   rom = 08 sbe_ = 1 mbe_ = 0
trick =ffffffffffff09  in =ffffffffffff09   rom = 09 sbe_ = 1 mbe_ = 0
trick =ffffffffffff0a  in =ffffffffffff0a   rom = 0a sbe_ = 1 mbe_ = 0
trick =ffffffffffff0b  in =ffffffffbff0b    rom = 0b sbe_ = 0 mbe_ = 1
trick =ffffffffffff0c  in =ffffffffffff0c   rom = 0c sbe_ = 1 mbe_ = 0
trick =ffffffffffff0d  in =ffffffffdff0d    rom = 0d sbe_ = 0 mbe_ = 1
trick =ffffffffffff0e  in =ffffffffefff0e   rom = 0e sbe_ = 0 mbe_ = 1
trick =ffffffffffff0f  in =ffffffffffff0f   rom = 0f sbe_ = 1 mbe_ = 0
trick =ffffffffffff10  in =ffffffffffff10   rom = 10 sbe_ = 1 mbe_ = 0
trick =ffffffffffff11  in =ffffffffffff11   rom = 11 sbe_ = 1 mbe_ = 0
trick =ffffffffffff12  in =ffffffffffff12   rom = 12 sbe_ = 1 mbe_ = 0
trick =ffffffffffff13  in =ffffffffffff13   rom = 13 sbe_ = 1 mbe_ = 0
trick =ffffffffffff14  in =ffffffffffff14   rom = 14 sbe_ = 1 mbe_ = 0
trick =ffffffffffff15  in =ffffffffffff15   rom = 15 sbe_ = 1 mbe_ = 0
trick =ffffffffffff16  in =ffffffff7ff16    rom = 16 sbe_ = 0 mbe_ = 1
trick =ffffffffffff17  in =ffffffffffff17   rom = 17 sbe_ = 1 mbe_ = 0
trick =ffffffffffff18  in =ffffffffffff18   rom = 18 sbe_ = 1 mbe_ = 0
trick =ffffffffffff19  in =ffffffffffff19   rom = 19 sbe_ = 1 mbe_ = 0
trick =ffffffffffff1a  in =ffffffffbff1a    rom = 1a sbe_ = 0 mbe_ = 1
trick =ffffffffffff1b  in =ffffffffffff1b   rom = 1b sbe_ = 1 mbe_ = 0
trick =ffffffffffff1c  in =ffffffffdff1c    rom = 1c sbe_ = 0 mbe_ = 1
trick =ffffffffffff1d  in =ffffffffffff1d   rom = 1d sbe_ = 1 mbe_ = 0
trick =ffffffffffff1e  in =ffffffffffff1e   rom = 1e sbe_ = 1 mbe_ = 0
trick =ffffffffffff1f  in =ffffffffefff1f   rom = 1f sbe_ = 0 mbe_ = 1
trick =ffffffffffff20  in =ffffffffffff20   rom = 20 sbe_ = 1 mbe_ = 0
trick =ffffffffffff21  in =ffffffffffff21   rom = 21 sbe_ = 1 mbe_ = 0
trick =ffffffffffff22  in =ffffffffffff22   rom = 22 sbe_ = 1 mbe_ = 0
```

APPENDIX-continued

In each of the following cases, the term "trick" refers to the forced data ($D_8 \ldots D_{63}$ and $C_0 \ldots C_7$) merged with the ROM data. The term "in" is the output of ECC block 106. When "sbe_" is low (zero), this indicates single-bit error status. When "mbe_" is low (zero), this indicates multi-bit error status. In each case where sbe_ = 0, one bit is complemented but that bit is not in the ROM data (the rightmost two hexadecimal characters).

```
trick =ffffffffffff23  in =ffffffffffff23   rom = 23 sbe_ = 1 mbe_ = 0
trick =ffffffffffff24  in =ffffffffffff24   rom = 24 sbe_ = 1 mbe_ = 0
trick =ffffffffffff25  in =ffffffff7ff25    rom = 25 sbe_ = 0 mbe_ = 1
trick =ffffffffffff26  in =ffffffffffff26   rom = 26 sbe_ = 1 mbe_ = 0
trick =ffffffffffff27  in =ffffffffffff27   rom = 27 sbe_ = 1 mbe_ = 0
trick =ffffffffffff28  in =ffffffffffff28   rom = 28 sbe_ = 1 mbe_ = 0
trick =ffffffffffff29  in =ffffffffbff29    rom = 29 sbe_ = 0 mbe_ = 1
trick =ffffffffffff2a  in =ffffffffffff2a   rom = 2a sbe_ = 1 mbe_ = 0
trick =ffffffffffff2b  in =ffffffffffff2b   rom = 2b sbe_ = 1 mbe_ = 0
trick =ffffffffffff2c  in =ffffffffefff2c   rom = 2c sbe_ = 0 mbe_ = 1
trick =ffffffffffff2d  in =ffffffffffff2d   rom = 2d sbe_ = 1 mbe_ = 0
trick =ffffffffffff2e  in =ffffffffffff2e   rom = 2e sbe_ = 1 mbe_ = 0
trick =ffffffffffff2f  in =ffffffffdff2f    rom = 2f sbe_ = 0 mbe_ = 1
trick =ffffffffffff30  in =ffffffffffff30   rom = 30 sbe_ = 1 mbe_ = 0
trick =ffffffffffff31  in =ffffffffffff31   rom = 31 sbe_ = 1 mbe_ = 0
trick =ffffffffffff32  in =ffffffffffff32   rom = 32 sbe_ = 1 mbe_ = 0
trick =ffffffffffff33  in =ffffffffffff33   rom = 33 sbe_ = 1 mbe_ = 0
trick =ffffffffffff34  in =ffffffff7ff34    rom = 34 sbe_ = 0 mbe_ = 1
trick =ffffffffffff35  in =ffffffffffff35   rom = 35 sbe_ = 1 mbe_ = 0
trick =ffffffffffff36  in =ffffffffffff36   rom = 36 sbe_ = 1 mbe_ = 0
trick =ffffffffffff37  in =ffffffffffff37   rom = 37 sbe_ = 1 mbe_ = 0
trick =ffffffffffff38  in =ffffffffbff38    rom = 38 sbe_ = 0 mbe_ = 1
trick =ffffffffffff39  in =ffffffffffff39   rom = 39 sbe_ = 1 mbe_ = 0
trick =ffffffffffff3a  in =ffffffffffff3a   rom = 3a sbe_ = 1 mbe_ = 0
trick =ffffffffffff3b  in =ffffffffffff3b   rom = 3b sbe_ = 1 mbe_ = 0
trick =ffffffffffff3c  in =ffffffffffff3c   rom = 3c sbe_ = 1 mbe_ = 0
trick =ffffffffffff3d  in =ffffffffefff3d   rom = 3d sbe_ = 0 mbe_ = 1
trick =ffffffffffff3e  in =ffffffffdff3e    rom = 3e sbe_ = 0 mbe_ = 1
trick =ffffffffffff3f  in =ffffffffffff3f   rom = 3f sbe_ = 1 mbe_ = 0
trick =ffffffffffff40  in =ffffffffffff40   rom = 40 sbe_ = 1 mbe_ = 0
trick =ffffffffffff41  in =ffffffffffff41   rom = 41 sbe_ = 1 mbe_ = 0
trick =ffffffffffff42  in =ffffffffffff42   rom = 42 sbe_ = 1 mbe_ = 0
trick =ffffffffffff43  in =ffffffff7ff43    rom = 43 sbe_ = 0 mbe_ = 1
trick =ffffffffffff44  in =ffffffffffff44   rom = 44 sbe_ = 1 mbe_ = 0
trick =ffffffffffff45  in =ffffffffffff45   rom = 45 sbe_ = 1 mbe_ = 0
trick =ffffffffffff46  in =ffffffffffff46   rom = 46 sbe_ = 1 mbe_ = 0
trick =ffffffffffff47  in =ffffffffffff47   rom = 47 sbe_ = 1 mbe_ = 0
trick =ffffffffffff48  in =ffffffffffff48   rom = 48 sbe_ = 1 mbe_ = 0
trick =ffffffffffff49  in =ffffffffdff49    rom = 49 sbe_ = 0 mbe_ = 1
trick =ffffffffffff4a  in =ffffffffefff4a   rom = 4a sbe_ = 0 mbe_ = 1
trick =ffffffffffff4b  in =ffffffffffff4b   rom = 4b sbe_ = 1 mbe_ = 0
trick =ffffffffffff4c  in =ffffffffffff4c   rom = 4c sbe_ = 1 mbe_ = 0
trick =ffffffffffff4d  in =ffffffffffff4d   rom = 4d sbe_ = 1 mbe_ = 0
trick =ffffffffffff4e  in =ffffffffffff4e   rom = 4e sbe_ = 1 mbe_ = 0
trick =ffffffffffff4f  in =ffffffffbff4f    rom = 4f sbe_ = 0 mbe_ = 1
trick =ffffffffffff50  in =ffffffffffff50   rom = 50 sbe_ = 1 mbe_ = 0
trick =ffffffffffff51  in =ffffffffffff51   rom = 51 sbe_ = 1 mbe_ = 0
trick =ffffffffffff52  in =ffffffff7ff52    rom = 52 sbe_ = 0 mbe_ = 1
trick =ffffffffffff53  in =ffffffffffff53   rom = 53 sbe_ = 1 mbe_ = 0
trick =ffffffffffff54  in =ffffffffffff54   rom = 54 sbe_ = 1 mbe_ = 0
trick =ffffffffffff55  in =ffffffffffff55   rom = 55 sbe_ = 1 mbe_ = 0
trick =ffffffffffff56  in =ffffffffffff56   rom = 56 sbe_ = 1 mbe_ = 0
trick =ffffffffffff57  in =ffffffffffff57   rom = 57 sbe_ = 1 mbe_ = 0
trick =ffffffffffff58  in =ffffffffdff58    rom = 58 sbe_ = 0 mbe_ = 1
trick =ffffffffffff59  in =ffffffffffff59   rom = 59 sbe_ = 1 mbe_ = 0
trick =ffffffffffff5a  in =ffffffffffff5a   rom = 5a sbe_ = 1 mbe_ = 0
trick =ffffffffffff5b  in =ffffffffefff5b   rom = 5b sbe_ = 0 mbe_ = 1
trick =ffffffffffff5c  in =ffffffffffff5c   rom = 5c sbe_ = 1 mbe_ = 0
trick =ffffffffffff5d  in =ffffffffffff5d   rom = 5d sbe_ = 1 mbe_ = 0
trick =ffffffffffff5e  in =ffffffffbff5e    rom = 5e sbe_ = 0 mbe_ = 1
trick =ffffffffffff5f  in =ffffffffffff5f   rom = 5f sbe_ = 1 mbe_ = 0
trick =ffffffffffff60  in =ffffffffffff60   rom = 60 sbe_ = 1 mbe_ = 0
trick =ffffffffffff61  in =ffffffff7ff61    rom = 61 sbe_ = 0 mbe_ = 1
trick =ffffffffffff62  in =ffffffffffff62   rom = 62 sbe_ = 1 mbe_ = 0
trick =ffffffffffff63  in =ffffffffffff63   rom = 63 sbe_ = 1 mbe_ = 0
trick =ffffffffffff64  in =ffffffffffff64   rom = 64 sbe_ = 1 mbe_ = 0
trick =ffffffffffff65  in =ffffffffffff65   rom = 65 sbe_ = 1 mbe_ = 0
trick =ffffffffffff66  in =ffffffffffff66   rom = 66 sbe_ = 1 mbe_ = 0
trick =ffffffffffff67  in =ffffffffffff67   rom = 67 sbe_ = 1 mbe_ = 0
trick =ffffffffffff68  in =ffffffffefff68   rom = 68 sbe_ = 0 mbe_ = 1
trick =ffffffffffff69  in =ffffffffffff69   rom = 69 sbe_ = 1 mbe_ = 0
```

APPENDIX-continued

In each of the following cases, the term "trick" refers to the forced data (D$_8$ ... D$_{63}$ and C$_0$ ... C$_7$) merged with the ROM data. The term "in" is the output of ECC block 106. When "sbe__" is low (zero), this indicates single-bit error status. When "mbe__" is low (zero), this indicates multi-bit error status. In each case where sbe__ = 0, one bit is complemented but that bit is not in the ROM data (the rightmost two hexadecimal characters).

| | | |
|---|---|---|
| trick =ffffffffffff6a | in =ffffffffffff6a | rom = 6a sbe__ = 1 mbe__ = 0 |
| trick =ffffffffffff6b | in =ffffffffdfff6b | rom = 6b sbe__ = 0 mbe__ = 1 |
| trick =ffffffffffff6c | in =ffffffffffff6c | rom = 6c sbe__ = 1 mbe__ = 0 |
| trick =ffffffffffff6d | in =ffffffffbfff6d | rom = 6d sbe__ = 0 mbe__ = 1 |
| trick =ffffffffffff6e | in =ffffffffffff6e | rom = 6e sbe__ = 1 mbe__ = 0 |
| trick =ffffffffffff6f | in =ffffffffffff6f | rom = 6f sbe__ = 1 mbe__ = 0 |
| trick =ffffffffffff70 | in =ffffffff7ff70 | rom = 70 sbe__ = 0 mbe__ = 1 |
| trick =ffffffffffff71 | in =ffffffffffff71 | rom = 71 sbe__ = 1 mbe__ = 0 |
| trick =ffffffffffff72 | in =ffffffffffff72 | rom = 72 sbe__ = 1 mbe__ = 0 |
| trick =ffffffffffff73 | in =ffffffffffff73 | rom = 73 sbe__ = 1 mbe__ = 0 |
| trick =ffffffffffff74 | in =ffffffffffff74 | rom = 74 sbe__ = 1 mbe__ = 0 |
| trick =ffffffffffff75 | in =ffffffffffff75 | rom = 75 sbe__ = 1 mbe__ = 0 |
| trick =ffffffffffff76 | in =ffffffffffff76 | rom = 76 sbe__ = 1 mbe__ = 0 |
| trick =ffffffffffff77 | in =ffffffffffff77 | rom = 77 sbe__ = 1 mbe__ = 0 |
| trick =ffffffffffff78 | in =ffffffffffff7e | rom = 78 sbe__ = 1 mbe__ = 0 |
| trick =ffffffffffff79 | in =ffffffffeff79 | rom = 79 sbe__ = 0 mbe__ = 1 |
| trick =ffffffffffff7a | in =ffffffffdff7a | rom = 7a sbe__ = 0 mbe__ = 1 |
| trick =ffffffffffff7b | in =ffffffffffff7b | rom = 7b sbe__ = 1 mbe__ = 0 |
| trick =ffffffffffff7c | in =ffffffffbff7c | rom = 7c sbe__ = 0 mbe__ = 1 |
| trick =ffffffffffff7d | in =ffffffffffff7d | rom = 7d sbe__ = 1 mbe__ = 0 |
| trick =ffffffffffff7e | in =ffffffffffff7e | rom = 7e sbe__ = 1 mbe__ = 0 |
| trick =ffffffffffff7f | in =ffffffffffff7f | rom = 7f sbe__ = 1 mbe__ = 0 |
| trick =ffffffffffff80 | in =ffffffffffff80 | rom = 80 sbe__ = 1 mbe__ = 0 |
| trick =ffffffffffff81 | in =ffffffffffff81 | rom = 81 sbe__ = 1 mbe__ = 0 |
| trick =ffffffffffff82 | in =ffffffffffff82 | rom = 82 sbe__ = 1 mbe__ = 0 |
| trick =ffffffffffff83 | in =ffffffffbff83 | rom = 83 sbe__ = 0 mbe__ = 1 |
| trick =ffffffffffff84 | in =ffffffffffff84 | rom = 84 sbe__ = 1 mbe__ = 0 |
| trick =ffffffffffff85 | in =ffffffffdff85 | rom = 85 sbe__ = 0 mbe__ = 1 |
| trick =ffffffffffff86 | in =ffffffffeff86 | rom = 86 sbe__ = 0 mbe__ = 1 |
| trick =ffffffffffff87 | in =ffffffffffff87 | rom = 87 sbe__ = 1 mbe__ = 0 |
| trick =ffffffffffff88 | in =ffffffffffff88 | rom = 88 sbe__ = 1 mbe__ = 0 |
| trick =ffffffffffff89 | in =ffffffffffff89 | rom = 89 sbe__ = 1 mbe__ = 0 |
| trick =ffffffffffff8a | in =ffffffffffff8a | rom = 8a sbe__ = 1 mbe__ = 0 |
| trick =ffffffffffff8b | in =ffffffffffff8b | rom = 8b sbe__ = 1 mbe__ = 0 |
| trick =ffffffffffff8c | in =ffffffffffff8c | rom = 8c sbe__ = 1 mbe__ = 0 |
| trick =ffffffffffff8d | in =ffffffffffff8d | rom = 8d sbe__ = 1 mbe__ = 0 |
| trick =ffffffffffff8e | in =ffffffffffff8e | rom = 8e sbe__ = 1 mbe__ = 0 |
| trick =ffffffffffff8f | in =ffffffff7ff8f | rom = 8f sbe__ = 0 mbe__ = 1 |
| trick =ffffffffffff90 | in =ffffffffffff90 | rom = 90 sbe__ = 1 mbe__ = 0 |
| trick =ffffffffffff91 | in =ffffffffffff91 | rom = 91 sbe__ = 1 mbe__ = 0 |
| trick =ffffffffffff92 | in =ffffffffbff92 | rom = 92 sbe__ = 0 mbe__ = 1 |
| trick =ffffffffffff93 | in =ffffffffffff93 | rom = 93 sbe__ = 1 mbe__ = 0 |
| trick =ffffffffffff94 | in =ffffffffdff94 | rom = 94 sbe__ = 0 mbe__ = 1 |
| trick =ffffffffffff95 | in =ffffffffffff95 | rom = 95 sbe__ = 1 mbe__ = 0 |
| trick =ffffffffffff96 | in =ffffffffffff96 | rom = 96 sbe__ = 1 mbe__ = 0 |
| trick =ffffffffffff97 | in =ffffffffeff97 | rom = 97 sbe__ = 0 mbe__ = 1 |
| trick =ffffffffffff98 | in =ffffffffffff98 | rom = 98 sbe__ = 1 mbe__ = 0 |
| trick =ffffffffffff99 | in =ffffffffffff99 | rom = 99 sbe__ = 1 mbe__ = 0 |
| trick =ffffffffffff9a | in =ffffffffffff9a | rom = 9a sbe__ = 1 mbe__ = 0 |
| trick =ffffffffffff9b | in =ffffffffffff9b | rom = 9b sbe__ = 1 mbe__ = 0 |
| trick =ffffffffffff9c | in =ffffffffffff9c | rom = 9c sbe__ = 1 mbe__ = 0 |
| trick =ffffffffffff9d | in =ffffffffffff9d | rom = 9d sbe__ = 1 mbe__ = 0 |
| trick =ffffffffffff9e | in =ffffffff7ff9e | rom = 9e sbe__ = 0 mbe__ = 1 |
| trick =ffffffffffff9f | in =ffffffffffff9f | rom = 9f sbe__ = 1 mbe__ = 0 |
| trick =ffffffffffffa0 | in =ffffffffffffa0 | rom = 00 sbe__ = 1 mbe__ = 0 |
| trick =ffffffffffffa1 | in =ffffffffbfffa1 | rom = a1 sbe__ = 0 mbe__ = 1 |
| trick =ffffffffffffa2 | in =ffffffffffffa2 | rom = a2 sbe__ = 1 mbe__ = 0 |
| trick =ffffffffffffa3 | in =ffffffffffffa3 | rom = a3 sbe__ = 1 mbe__ = 0 |
| trick =ffffffffffffa4 | in =ffffffffefffa4 | rom = a4 sbe__ = 0 mbe__ = 1 |
| trick =ffffffffffffa5 | in =ffffffffffffa5 | rom = a5 sbe__ = 1 mbe__ = 0 |
| trick =ffffffffffffa6 | in =ffffffffffffa6 | rom = a6 sbe__ = 1 mbe__ = 0 |
| trick =ffffffffffffa7 | in =ffffffffdfffa7 | rom = a7 sbe__ = 0 mbe__ = 1 |
| trick =ffffffffffffa8 | in =ffffffffffffa8 | rom = a8 sbe__ = 1 mbe__ = 0 |
| trick =ffffffffffffa9 | in =ffffffffffffa9 | rom = a9 sbe__ = 1 mbe__ = 0 |
| trick =ffffffffffffaa | in =ffffffffffffaa | rom = aa sbe__ = 1 mbe__ = 0 |
| trick =ffffffffffffab | in =ffffffffffffab | rom = ab sbe__ = 1 mbe__ = 0 |
| trick =ffffffffffffac | in =ffffffffffffac | rom = ac sbe__ = 1 mbe__ = 0 |
| trick =ffffffffffffad | in =ffffffff7fffad | rom = ad sbe__ = 0 mbe__ = 1 |
| trick =ffffffffffffae | in =ffffffffffffae | rom = ae sbe__ = 1 mbe__ = 0 |
| trick =ffffffffffffaf | in =ffffffffffffaf | rom = af sbe__ = 1 mbe__ = 0 |
| trick =ffffffffffffb1 | in =ffffffffffffb1 | rom = b1 sbe__ = 1 mbe__ = 0 |
| trick =ffffffffffffb2 | in =ffffffffffffb2 | rom = b2 sbe__ = 1 mbe__ = 0 |
| trick =ffffffffffffb3 | in =ffffffffffffb3 | rom = b3 sbe__ = 1 mbe__ = 0 |
| trick =ffffffffffffb4 | in =ffffffffffffb4 | rom = b4 sbe__ = 1 mbe__ = 0 |
| trick =ffffffffffffb5 | in =ffffffffefffb5 | rom = b5 sbe__ = 0 mbe__ = 1 |
| trick =ffffffffffffb6 | in =ffffffffdfffb6 | rom = b6 sbe__ = 0 mbe__ = 1 |
| trick =ffffffffffffb7 | in =ffffffffffffb7 | rom = b7 sbe__ = 1 mbe__ = 0 |
| trick =ffffffffffffb8 | in =ffffffffffffb8 | rom = b8 sbe__ = 1 mbe__ = 0 |
| trick =ffffffffffffb9 | in =ffffffffffffb9 | rom = b9 sbe__ = 1 mbe__ = 0 |
| trick =ffffffffffffba | in =ffffffffffffba | rom = ba sbe__ = 1 mbe__ = 0 |
| trick =ffffffffffffbb | in =ffffffffffffbb | rom = bb sbe__ = 1 mbe__ = 0 |
| trick =ffffffffffffbc | in =ffffffff7fffbc | rom = bc sbe__ = 0 mbe__ = 1 |
| trick =ffffffffffffbd | in =ffffffffffffbd | rom = bd sbe__ = 1 mbe__ = 0 |
| trick =ffffffffffffbe | in =ffffffffffffbe | rom = be sbe__ = 1 mbe__ = 0 |
| trick =ffffffffffffbf | in =ffffffffffffbf | rom = bf sbe__ = 1 mbe__ = 0 |
| trick =ffffffffffffc0 | in =ffffffffffffc0 | rom = c0 sbe__ = 1 mbe__ = 0 |
| trick =ffffffffffffc1 | in =ffffffffdfffc1 | rom = c1 sbe__ = 0 mbe__ = 1 |
| trick =ffffffffffffc2 | in =ffffffffefffc2 | rom = c2 sbe__ = 0 mbe__ = 1 |
| trick =ffffffffffffc3 | in =ffffffffffffc3 | rom = c3 sbe__ = 1 mbe__ = 0 |
| trick =ffffffffffffc4 | in =ffffffffffffc4 | rom = c4 sbe__ = 1 mbe__ = 0 |
| trick =ffffffffffffc5 | in =ffffffffffffc5 | rom = c5 sbe__ = 1 mbe__ = 0 |
| trick =ffffffffffffc6 | in =ffffffffffffc6 | rom = c6 sbe__ = 1 mbe__ = 0 |
| trick =ffffffffffffc7 | in =ffffffffbfffc7 | rom = c7 sbe__ = 0 mbe__ = 1 |
| trick =ffffffffffffc8 | in =ffffffffffffc8 | rom = c8 sbe__ = 1 mbe__ = 0 |
| trick =ffffffffffffc9 | in =ffffffffffffc9 | rom = c9 sbe__ = 1 mbe__ = 0 |
| trick =ffffffffffffca | in =ffffffffffffca | rom = ca sbe__ = 1 mbe__ = 0 |
| trick =ffffffffffffcb | in =ffffffff7fffcb | rom = cb sbe__ = 0 mbe__ = 1 |
| trick =ffffffffffffcc | in =ffffffffffffcc | rom = cc sbe__ = 1 mbe__ = 0 |
| trick =ffffffffffffcd | in =ffffffffffffcd | rom = cd sbe__ = 1 mbe__ = 0 |
| trick =ffffffffffffce | in =ffffffffffffce | rom = ce sbe__ = 1 mbe__ = 0 |
| trick =ffffffffffffcf | in =ffffffffffffcf | rom = cf sbe__ = 1 mbe__ = 0 |
| trick =ffffffffffffd0 | in =ffffffffdfffd0 | rom = d0 sbe__ = 0 mbe__ = 1 |
| trick =ffffffffffffd1 | in =ffffffffffffd1 | rom = d1 sbe__ = 1 mbe__ = 0 |
| trick =ffffffffffffd2 | in =ffffffffffffd2 | rom = d2 sbe__ = 1 mbe__ = 0 |
| trick =ffffffffffffd3 | in =ffffffffefffd3 | rom = d3 sbe__ = 0 mbe__ = 1 |
| trick =ffffffffffffd4 | in =ffffffffffffd4 | rom = d4 sbe__ = 1 mbe__ = 0 |
| trick =ffffffffffffd5 | in =ffffffffffffd5 | rom = d5 sbe__ = 1 mbe__ = 0 |
| trick =ffffffffffffd6 | in =ffffffffbfffd6 | rom = d6 sbe__ = 0 mbe__ = 1 |
| trick =ffffffffffffd7 | in =ffffffffffffd7 | rom = d7 sbe__ = 1 mbe__ = 0 |
| trick =ffffffffffffd8 | in =ffffffffffffd8 | rom = d8 sbe__ = 1 mbe__ = 0 |
| trick =ffffffffffffd9 | in =ffffffffffffd9 | rom = d9 sbe__ = 1 mbe__ = 0 |
| trick =ffffffffffffda | in =ffffffff7fffda | rom = da sbe__ = 0 mbe__ = 1 |
| trick =ffffffffffffdb | in =ffffffffffffdb | rom = db sbe__ = 1 mbe__ = 0 |
| trick =ffffffffffffdc | in =ffffffffffffdc | rom = dc sbe__ = 1 mbe__ = 0 |
| trick =ffffffffffffdd | in =ffffffffffffdd | rom = dd sbe__ = 1 mbe__ = 0 |
| trick =ffffffffffffde | in =ffffffffffffde | rom = de sbe__ = 1 mbe__ = 0 |
| trick =ffffffffffffdf | in =ffffffffffffdf | rom = df sbe__ = 1 mbe__ = 0 |
| trick =ffffffffffffe0 | in =ffffffffeffe0 | rom = e0 sbe__ = 0 mbe__ = 1 |
| trick =ffffffffffffe1 | in =ffffffffffffe1 | rom = e1 sbe__ = 1 mbe__ = 0 |
| trick =ffffffffffffe2 | in =ffffffffffffe2 | rom = e2 sbe__ = 1 mbe__ = 0 |
| trick =ffffffffffffe3 | in =ffffffffdfffe3 | rom = e3 sbe__ = 0 mbe__ = 1 |
| trick =ffffffffffffe4 | in =ffffffffffffe4 | rom = e4 sbe__ = 1 mbe__ = 0 |
| trick =ffffffffffffe5 | in =ffffffffbfffe5 | rom = e5 sbe__ = 0 mbe__ = 1 |
| trick =ffffffffffffe6 | in =ffffffffffffe6 | rom = e6 sbe__ = 1 mbe__ = 0 |
| trick =ffffffffffffe7 | in =ffffffffffffe7 | rom = e7 sbe__ = 1 mbe__ = 0 |
| trick =ffffffffffffe8 | in =ffffffffffffe8 | rom = e8 sbe__ = 1 mbe__ = 0 |
| trick =ffffffffffffe9 | in =ffffffff7fffe9 | rom = e9 sbe__ = 0 mbe__ = 1 |
| trick =ffffffffffffea | in =ffffffffffffea | rom = ea sbe__ = 1 mbe__ = 0 |
| trick =ffffffffffffeb | in =ffffffffffffeb | rom = eb sbe__ = 1 mbe__ = 0 |
| trick =ffffffffffffec | in =ffffffffffffec | rom = ec sbe__ = 1 mbe__ = 0 |
| trick =ffffffffffffed | in =ffffffffffffed | rom = ed sbe__ = 1 mbe__ = 0 |
| trick =ffffffffffffee | in =ffffffffffffee | rom = ee sbe__ = 1 mbe__ = 0 |
| trick =ffffffffffffef | in =ffffffffffffef | rom = ef sbe__ = 1 mbe__ = 0 |
| trick =fffffffffffff0 | in =fffffffffffff0 | rom = f0 sbe__ = 1 mbe__ = 0 |
| trick =fffffffffffff1 | in =ffffffffefffff1 | rom = f1 sbe__ = 0 mbe__ = 1 |
| trick =fffffffffffff2 | in =ffffffffdffff2 | rom = f2 sbe__ = 0 mbe__ = 1 |
| trick =fffffffffffff3 | in =fffffffffffff3 | rom = f3 sbe__ = 1 mbe__ = 0 |
| trick =fffffffffffff4 | in =ffffffffbffff4 | rom = f4 sbe__ = 0 mbe__ = 1 |
| trick =fffffffffffff5 | in =fffffffffffff5 | rom = f5 sbe__ = 1 mbe__ = 0 |
| trick =fffffffffffff6 | in =fffffffffffff6 | rom = f6 sbe__ = 1 mbe__ = 0 |
| trick =fffffffffffff7 | in =fffffffffffff7 | rom = f7 sbe__ = 1 mbe__ = 0 |
| trick =fffffffffffff8 | in =ffffffff7ffff8 | rom = f8 sbe__ = 0 mbe__ = 1 |

APPENDIX-continued

In each of the following cases, the term "trick" refers to the forced data ($D_8 \ldots D_{63}$ and $C_0 \ldots C_7$) merged with the ROM data. The term "in" is the output of ECC block 106. When "sbe__" is low (zero), this indicates single-bit error status. When "mbe__" is low (zero), this indicates multi-bit error status. In each case where sbe__ = 0, one bit is complemented but that bit is not in the ROM data (the rightmost two hexadecimal characters).

| | | |
|---|---|---|
| trick =fffffffffffff9 | in =fffffffffffff9 | rom = f9 sbe__ = 1 mbe__ = 0 |
| trick =fffffffffffffa | in =fffffffffffffa | rom = fa sbe__ = 1 mbe__ = 0 |
| trick =fffffffffffffb | in =fffffffffffffb | rom = fb sbe__ = 1 mbe__ = 0 |
| trick =fffffffffffffc | in =fffffffffffffc | rom = fc sbe__ = 1 mbe__ = 0 |
| trick =fffffffffffffd | in =fffffffffffffd | rom = fd sbe__ = 1 mbe__ = 0 |
| trick =fffffffffffffe | in =fffffffffffffe | rom = fe sbe__ = 1 mbe__ = 0 |
| trick =ffffffffffffff | in =ffffffffffffff | rom = ff sbe__ = 1 mbe__ = 0 |

I claim:

1. A method of communicating between components in a computer system, comprising the step of:

providing a communications path between a first component of the computer system and a second component of the computer system, wherein the first component transmits data to the second component using a first granularity, and wherein the communications path includes an error-correction code (ECC) circuit adapted to detect and correct memory errors transmitted from the first component to the second component;

interconnecting a third component to the communications path such that the third component may transmit data to the second component using a second granularity which is smaller than the first granularity; and merging data from the third component with predefined data to present a merged data word to the ECC circuit, the merged data word having the first granularity.

2. The method of claim 1 further comprising the step of correcting a single-bit error in the merged data word using the ECC circuit.

3. The method of claim 1 wherein the first granularity is 72 bits, the second granularity is 8 bits, and further comprising the step of creating the predefined data with 64 bits.

4. The method of claim 1 wherein said merging step includes the step of forcing undriven check bits and undriven data bits to a predefined state such that error correction of the merged data word by the ECC circuit results in modification of the predefined data and not in modification of the data from the third component.

5. The method of claim 4 wherein the undriven check bits and undriven data bits are forced to the predefined state using a plurality of respective pull-up resistors.

6. The method of claim 1 wherein:

the first component is a random-access memory (RAM) device;

the second component is a central processing unit (CPU);

the third component is a read-only memory (ROM) device; and said interconnecting step includes the steps of connecting the ECC circuit and the CPU to a system bus, and connecting the RAM device, the ROM device and the ECC circuit to a memory bus.

7. The method of claim 6 further comprising the steps of:

forwarding a plurality of such merged data words to a memory controller;

constructing a ROM word having the first granularity using the memory controller; and transmitting the ROM word from the memory controller to the CPU.

8. The method of claim 6 wherein said merging step includes the step of forcing undriven check bits and undriven data bits to a predefined state such that error correction of the merged data word by the ECC circuit results in of modification the predefined data and not in modification of the data from the ROM device.

9. The method of claim 8 wherein the undriven check bits and undriven data bits are forced to the predefined state using a plurality of respective pull-up resistors.

10. A computer system comprising:

a random-access memory (RAM) device having a first data width;

a read-only memory (ROM) device having a second data width which is smaller than said first data width;

means for processing program instructions;

means interconnecting said processing means with said RAM and ROM devices, said interconnecting means including error-correction code (ECC) means for correcting an error in a memory word transmitted by said RAM device; and means for merging a memory word from said ROM device with predefined data to present a merged data word to said ECC means, wherein said merged data word has a width equal to said first data width.

11. The computer system of claim 10 wherein said ECC means corrects a single-bit error in said merged data word.

12. The computer system of claim 10 wherein:

said first data width is 72 bits; and said second data width is 8 bits.

13. The computer system of claim 10 wherein said merging means forces undriven check bits and undriven data bits in said ECC means to a predefined state such that error correction of said merged data word by said ECC means results in modification of said predefined data and not in modification of said memory word from said ROM device.

14. The computer system of claim 10 wherein said merging means includes a plurality of respective pull-up resistors adapted to bias said undriven check bits and said undriven data bits to the predefined state.

15. The computer system of claim 10 wherein said interconnecting means includes a memory controller having means for constructing a ROM word having the first data width from a plurality of said merged data words.

* * * * *